June 20, 1944.  A. FAGERLUND  2,352,089
WINDMILL CONTROL
Filed Nov. 18, 1941  4 Sheets-Sheet 1
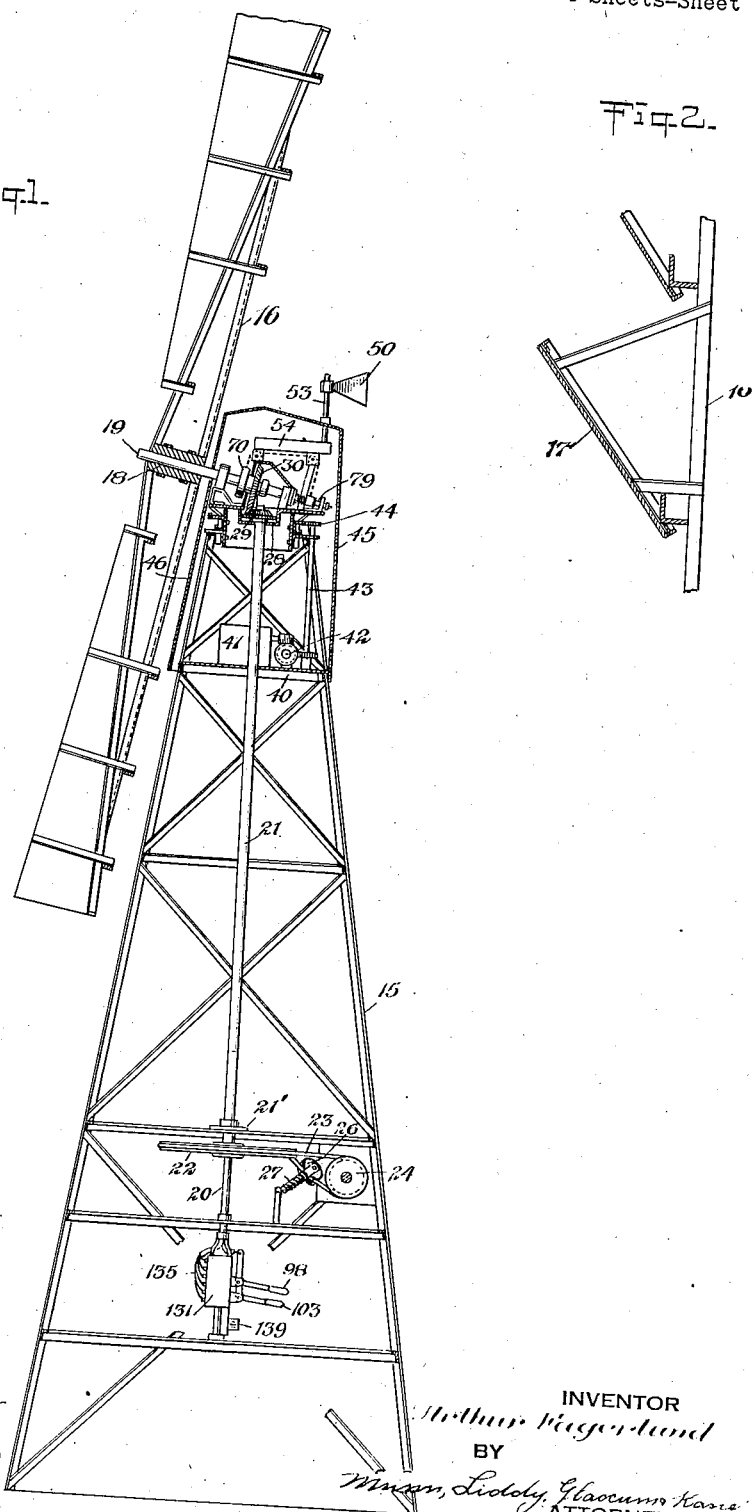

June 20, 1944.  A. FAGERLUND  2,352,089
WINDMILL CONTROL
Filed Nov. 18, 1941  4 Sheets-Sheet 2
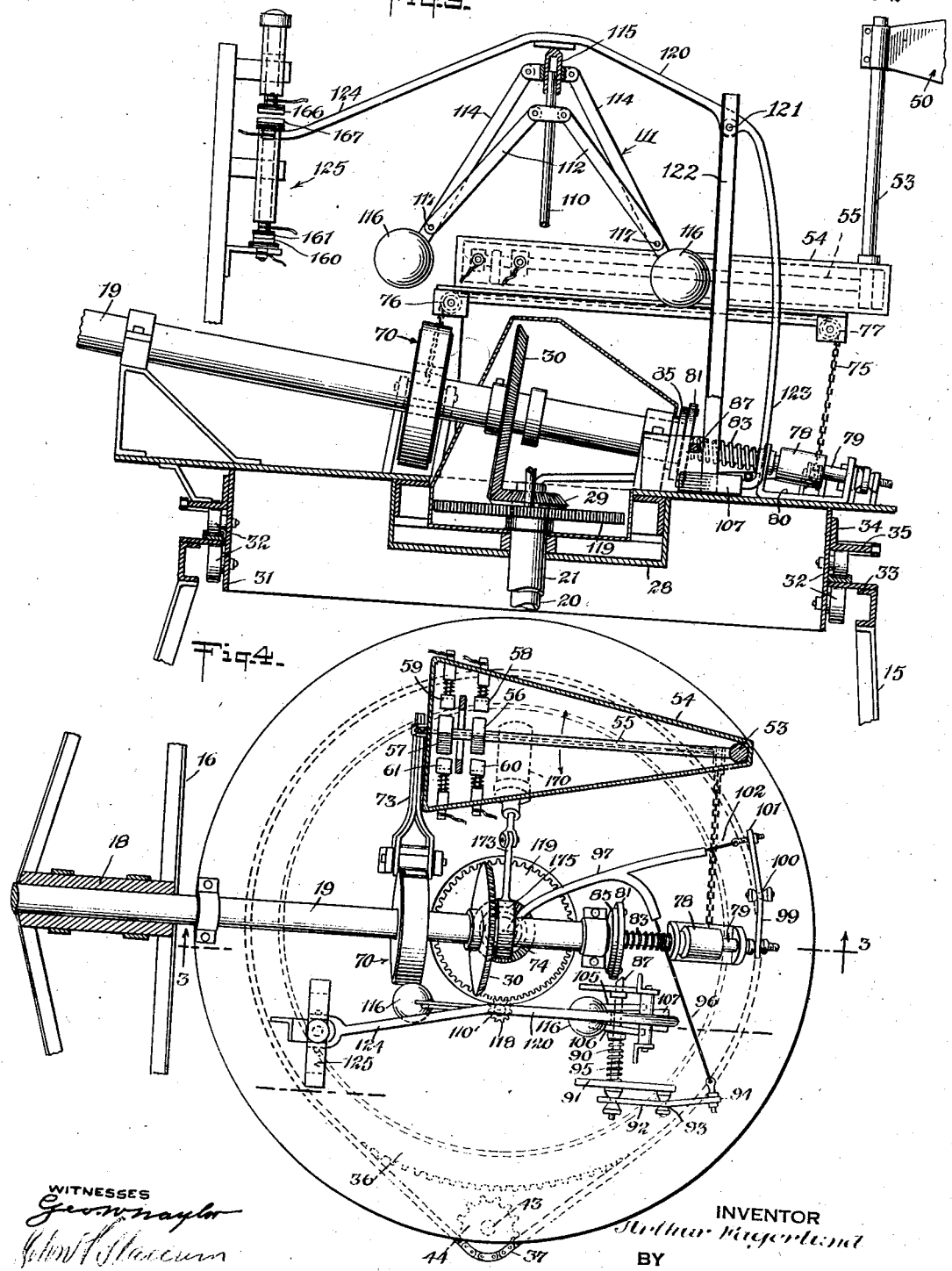
INVENTOR
Arthur Fagerlund
BY
ATTORNEYS
WITNESSES June 20, 1944.  A. FAGERLUND  2,352,089
WINDMILL CONTROL
Filed Nov. 18, 1941  4 Sheets-Sheet 3
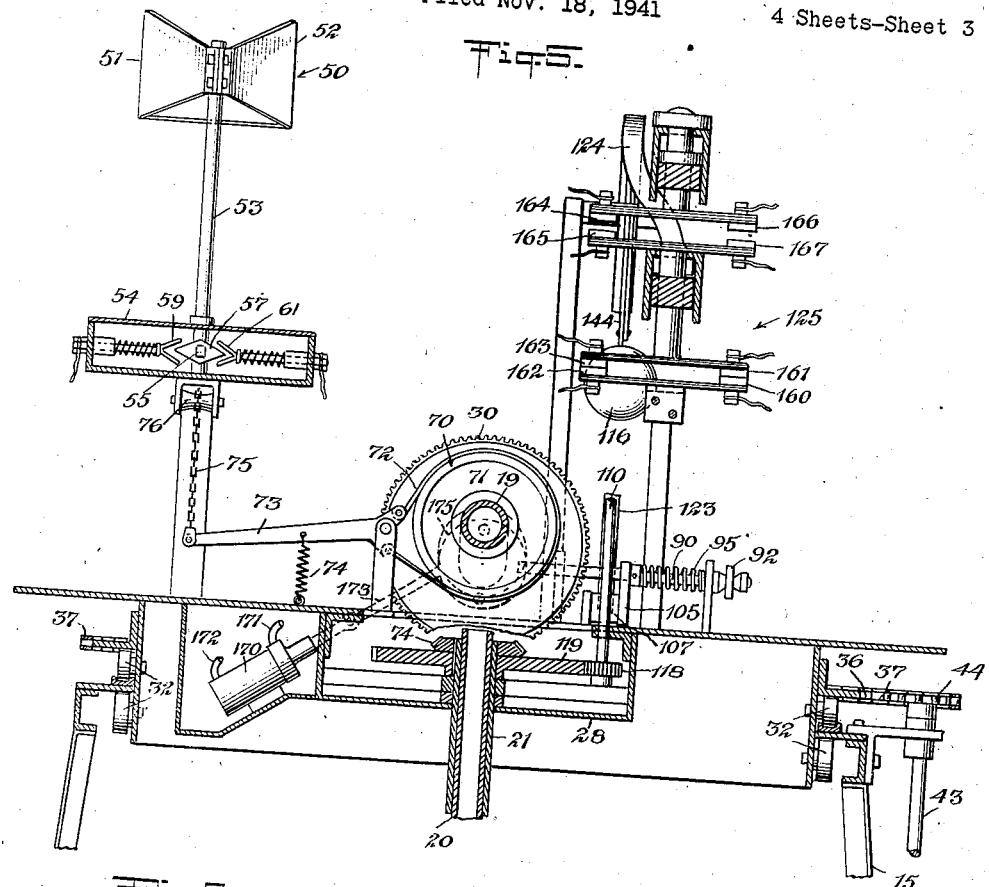
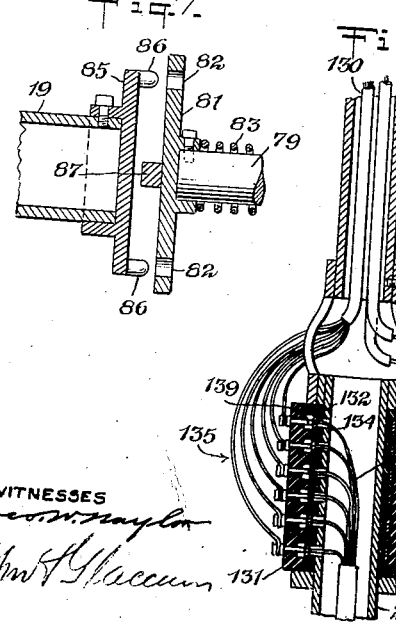
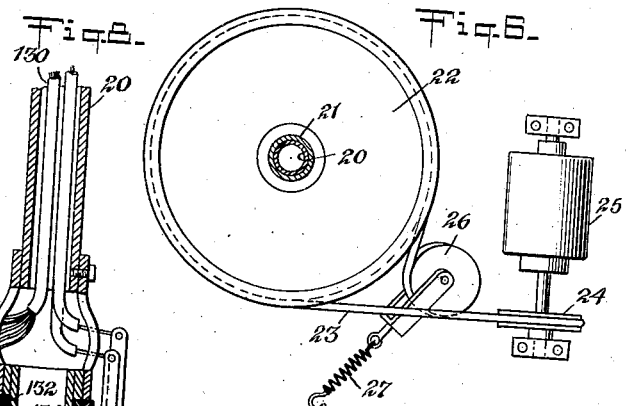
WITNESSES
INVENTOR
Arthur Fagerlund
BY
ATTORNEYS

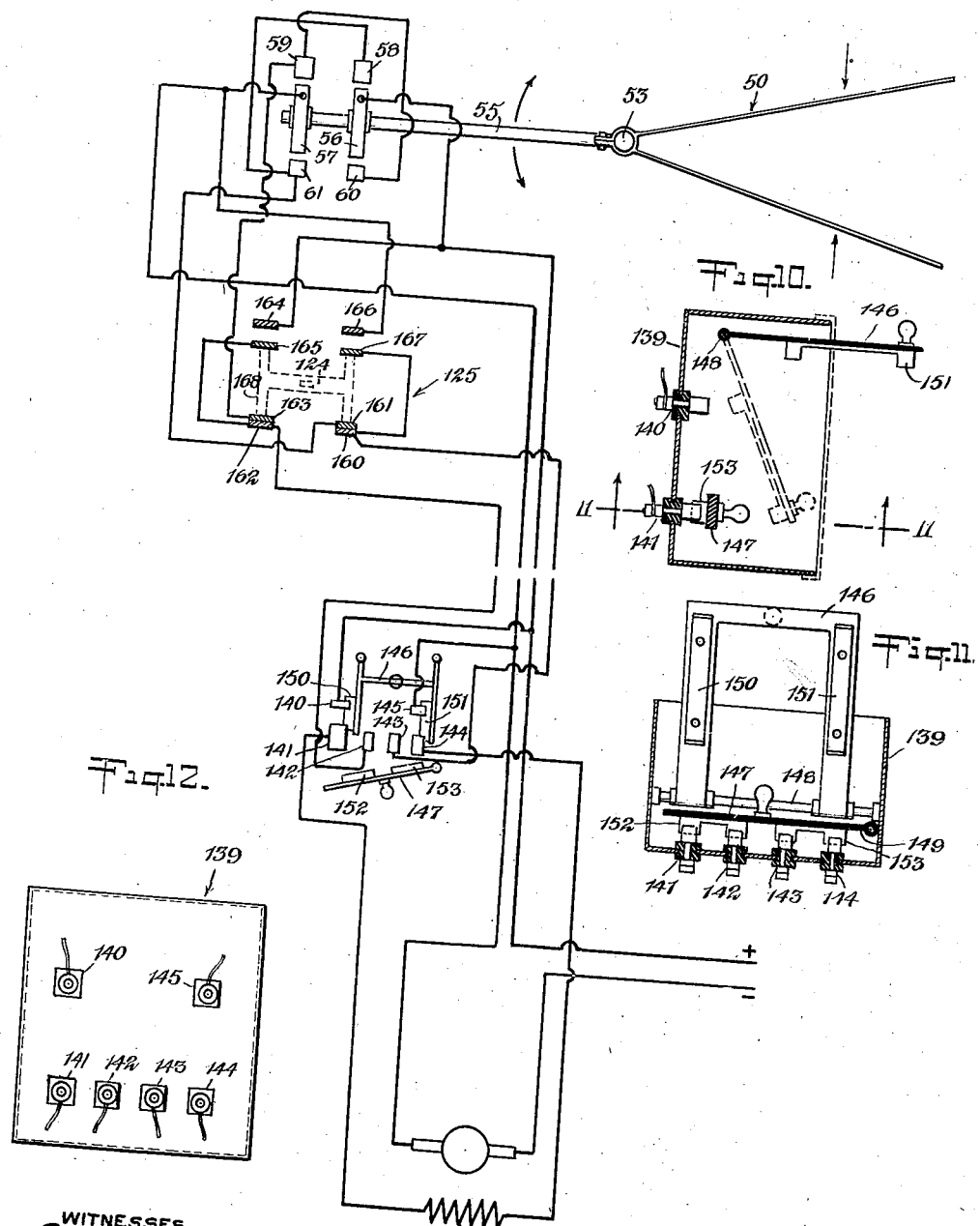

Patented June 20, 1944

2,352,089

UNITED STATES PATENT OFFICE 2,352,089

WINDMILL CONTROL

Arthur Fagerlund, Brooklyn, N. Y.

Application November 18, 1941, Serial No. 419,603

5 Claims. (Cl. 170—37)

This invention relates to controls, and more particularly to a control for a wind apparatus for generating power or electricity.

It has been customary in building windmills to provide them with a tail or directing vane to keep the wheel or blades into the wind in order that the full force of the wind might be made use of. In constructions of this type the wind blowing through the wheel caught the vane or tail and swung the apparatus into the wind. The vane or tail was connected directly or indirectly to the wheel, and since the apparatus is quite heavy the vane or tail necessarily was of a considerable size. This type of construction is objectionable since it precludes, to a great extent, the use of wind apparatus where there is not sufficient room for the large tail, such as on the tops of buildings or in other restricted spaces. It is further objectionable in that it could not be operated by a mild breeze and provided no mechanism for excessive winds.

An object of this invention is to provide a wind apparatus which will have automatic mechanism to turn it into the wind with the slightest breeze.

A further object is to govern such mechanism by a relatively small vane or flier which will be automatic in its operation.

A further object is to provide mechanism which will govern the speed of the wheel and which will restrict excessive and injurious speeds.

A still further object of the invention is to provide an apparatus which will move the wheel out of the direct path of the wind when the velocity is too great.

Another object is to provide mechanism of the class described which may be operated both automatically and manually.

Other objects and advantages will appear as the description proceeds.

In the accompanying drawings—

Fig. 1 is a view partly in section showing the construction of a wind apparatus employing my invention;

Fig. 2 is a cross-sectional view showing the nature of the air blades;

Fig. 3 is a detailed sectional view taken on the line 3—3 of Fig. 4, showing the operation of my control mechanism;

Fig. 4 is a plan view in section showing the same mechanism;

Fig. 5 is a cross-sectional view from the wheel end of the device;

Fig. 6 is a detailed view showing the power take-off;

Fig. 7 is a detailed cross-sectional view of the clutch member employed;

Fig. 8 is a detailed view showing the manner in which the cables and wires are installed;

Fig. 9 is a diagrammatic view showing the circuit employed;

Fig. 10 is a sectional view of the switch which may be used in connection with my invention;

Fig. 11 is a cross-sectional view taken on the line 11—11 of Fig. 10;

Fig. 12 is a rear view of the switch box.

My improved wind apparatus has the customary tower 15 which may be of any desired shape or height, and a wheel 16 having blades or fins 17 adapted to catch the wind. The wheel 16 is provided with a hub 18 and is adapted to rotate the shaft 19. A central hollow shaft 20 extends down through the tower to the bearing 21 and carries a pulley wheel 22. The pulley wheel 22 is provided with a belt 23 which engages the pulley 24 of the generator 25. The pulley 26 likewise engages the belt 23 and is provided with a spring 27 fastened to the frame of the tower 15 to maintain tension on the belt 23. The top of the shaft 20 is mounted on the casing 28 and is provided with a beveled gear 29 adapted to engage the beveled gear 30 on the shaft 19.

The housing 31 is provided with rollers 32 adapted to engage the track 33 at the top of the tower 15 so that the entire housing 31 may rotate on the rollers. On the outer section of the casing 31 is an annular flange 34 having teeth 35 on its outer edge forming a sprocket 36. A chain 37 engages the sprocket 36. At the upper part of the tower 15 is a platform 40 on which is mounted the motor 41 connected by suitable gearing 42 to the shaft 43. At the upper end of the shaft 43 is a sprocket 44 which engages the chain 37 to rotate the housing 31. A cover 45 may be mounted on the housing 31 and may be provided with sides 46 to extend down over the platform 40 and to protect it from the elements.

It will be seen at this point that as the wheel 16 rotates, it turns through the gears 29 and 30, the shaft 20 transmitting power to the generator 25. It will also be seen that by energizing the motor 41, which is preferably a reversible motor, the entire housing 31 may be turned to bring the wheel 16 into any desired position with the wind.

Under normal conditions the motor 41 is controlled by a small flier or fin 50. This fin may be V-shaped having two sides 51 and 52 to make it more sensitive to the wind. The flier is mounted upon a shaft 53, which shaft is mounted on the switch box 54. Connected to the shaft 53 is an arm 55 adapted to move laterally as the shaft 53 is rotated. On the end of the shaft 55 are contacts 56 and 57. The contacts 56 and 57 are adapted to engage spring contacts 58 and 59 to energize the motor to rotate the housing in one direction and contacts 60 and 61 to rotate the motor in the opposite direction. It will be seen, therefore, that when the wind pressure causes the flier 50 to move, the shaft 53 rotates and causes the contacts 56 and 57 to engage either contacts 58 and 59 or 60 and 61 closing a circuit to energize the motor and thus rotating the housing until the wheel is brought into the desired position, whereupon the action of the wind will return the switch to the open position breaking the circuit until a further shift of the wind requires a change.

Mounted around the shaft 19 is a brake mechanism 70 comprising a drum 71 and brake band 72. A lever 73 is held by a spring 74 to normally allow free rotation of the drum 71. A chain 75 engages the end of the lever 73 and when pressure is brought upon the chain 75 the brake band 72 will tighten on the drum to exert pressure thereon and to control the speed of rotation thereof. The chain 75 passes over the pulleys 76 and 77 to a spool or drum 78. The spool or drum is mounted on a shaft 79 which is mounted in the bracket 80 for slidable rotation therein. On the inner end of the shaft 79 is a clutch member 81 having apertures 82 therein. A spring 83 is positioned between the clutch member 81 and the bracket 80 to normally push the shaft inwardly. On the inner end of the shaft 19 is mounted a corresponding clutch member 82 having projections 86 thereon adapted to engage the apertures 82 in the clutch member 81. A spring latch member 87 is positioned adjacent the clutch member 81 to hold it away from the clutch member 85.

The latch member 87 has a long shaft 90 which passes through the bracket 91 and engages the lever arm 92 which is fulcrumed at 93 so that pressure at the end 94 thereof will tend to pull the shaft 90 rearwardly against the spring 95. A cable 96 engages the end 94 and lever 92 and passes through the tubing 97 down through the hollow shaft 20 to an operating handle 98. Mounted on the end of the shaft 79 is another lever arm 99 fulcrumed at 100 and having an end 101 engaging the cable 102 which passes through the tubing 97 to the operating handle 103. As has been previously stated, the spring 95 tends to push the latch forward.

It will be seen from the foregoing that by moving the operating handle 98 pressure will be exerted on the lever 92 to pull the latch through the arm 90 rearwardly and release the clutch member 81 allowing it to be pushed forwardly by the spring 83 to engage the clutch member 85. The rotation of the shaft 19 will then cause the chain to wind on the drum 78 thus exerting pressure on the brake arm 73 and the band 72 to stop the rotation of the shaft 19 and therefore the rotation of the wheel. By moving the operating handle 103, pressure is exerted on the cable 102 and the lever arm 99 to separate the clutch members 81 and 85 and to allow the latch member 87 to be pushed forwardly to maintain the separation, thus freeing the brake 70 and allowing the free rotation of the shaft 90 on the wheel 60. This covers the manual operation of the brake.

The brake is also automatically operated. Mounted about the shaft 90 is a stationary member 105 and mounted on the shaft 90 is a similar member 106. A wedge 107 is positioned between these members and it will be understood that movement of the wedge 107 between these members will force the shaft 90 rearwardly and free the latch member 87 from the clutch member 81, thus setting the brake in action as heretofore explained.

Mounted on the shaft 110 is a governor 111 comprising a pair of arms 112 fixedly mounted on the shaft 110 by the bracket 113 and a pair of arms 114 engaging the slidable cap 115. The arms 114 engage the balls or weights 116 and the arms 112 are pivoted to the arms 114 at 117. The shaft 110 has at its lower end a gear 118 which engages a gear 119 on the shaft 21 immediately below the gear 29. As the shaft 21 is rotated the shaft 110 is likewise rotated, and as the speed of rotation increases centrifugal force will move the weights 116 outwardly thus sliding the cap 115 upwardly on the shaft 110. Mounted above the cap 115 is a member 120 fulcrumed at 121 to the support 122. One end 123 of the member 120 engages the wedge 107 while the other end 124 engages the switch 125. It will be appreciated that as the speed of rotation is increased and the cap 115 pushed upwardly, the wedge 107 will be forced between the members 105 and 106 to release the latch 87 and allow the clutch members 81 and 85 to engage, thus causing the drum 78 to rotate and to exert pressure on the brake 70 at the same time the switch 125 will be operated. The switch 125 disconnects the automatic flier control and, as long as it is open, transfers the control of the motor 41 to the manual switch at the base of the tower, thus preventing the platform from shifting the wheel into the wind.

In addition to the automatic control, a manual control is provided. Referring to Fig. 8, it will be seen that the various wires are led down through the hollow shaft 20 through the tube 130. Since the shaft 20 rotates and the tube 130 necessarily rotates with it, it is necessary to provide means to maintain contact which will prevent the wires from being torn off. This is done by means of the multiple contact rings 131 and 132. These rings are made of insulating material but have contact members 133 and 134 so that the wires 135 maintain contact with the corresponding wires 136 leading to the switch mechanism shown in Figs. 9 to 12 inclusive. The wires lead to the switch 139 having contact points 140, 141, 142, 143, 144 and 145.

The switch 139 has two switch members 146 and 147. The switch member 146 is pivoted on the rod 148 while the switch member 147 is pivoted on the rod 149 at right angles thereto. The switch member 146 has contact bars 150 and 151 while similar bars are provided for the switch member 147 indicated by the numerals 152 and 153. It will be seen that the contact bar 152 connects the contacts 141 and 142 while the contact bar 153 connects the contacts 143 and 144 when automatic operation is desired. When manual control is desired, the switch 147 is pulled and the switch 146 is used. The bar 150 will then connect the contacts 140 and 141 while the bar 151 connects the contacts 144 and 145. Since the switches are located at right angles to each other, there is no danger of both being connected at one time thus causing a short circuit.

It will be seen that the switch 125 is provided with contacts 160, 161, 162, 163, 164, 165, 166 and 167. The contacts 161, 163, 165 and 167 are mounted on the slidable bracket 168 which is engaged by the end 124 of the arm 120. It will be seen that in normal operation the contacts 160 and 161 are engaged by the contacts 162 and 163. When the governor 111 goes into operation these contacts are broken and the contacts 164, 165, 166 and 167 are engaged. When the wheel revolves sufficiently fast to cause the governor to operate, the brake will go on as previously explained. By pulling the switch 147 and operating the switch 146, the windmill may then be turned to any desired position. When the wind abates the brake may be released by means of the operating handle 103 and by reversing the switches the automatic control will be put back into operation.

An oil pump 170 having intake and out-take lines 171 and 172 is provided with a shaft 173 operated by the eccentric 175 to insure a normal flow of oil through the working parts.

I claim:

1. In a windmill, motor means for turning said windmill into the wind, automatic means to energize said motor, braking means to control the rotation of said windmill, automatic means for setting said braking means, a hollow shaft in said windmill, and manually controlled cables for setting and releasing said braking means including a pair of cables extending through said hollow shaft one of said cables operating the setting means and the other of said cables releasing the braking means.

2. A windmill control apparatus, including a motor for turning said windmill into the wind, automatic means for energizing said motor operated by the wind, brake means for controlling the speed of said windmill, and additional means for setting said brake and disconnecting said automatic means when the speed of said windmill becomes excessive.

3. In combination with a windmill mounted for rotation upon a shaft, control mechanism therefor, said mechanism including a drum on said shaft, a brake band, a lever for tightening said band, a flexible member engaging said lever, a spool engaging the end of said flexible member, a second shaft cooperating with said spool, clutch means between said second shaft and the windmill bearing shaft whereby the rotation of the windmill bearing shaft can be transmitted to the second-mentioned shaft to rotate said spool to cause said flexible member to wind thereon and to exert pressure on said lever.

4. In combination with a windmill mounted for rotation upon and with a shaft, including a drum on said shaft, a brake band cooperating with said drum, a lever for tightening said drum, a flexible member engaging said lever, a spool engaging the end of said flexible member, a second shaft cooperating with said spool, clutch means between said second shaft and the windmill bearing shaft whereby the rotation of the windmill bearing shaft may be transmitted to the second-mentioned shaft to rotate said spool to cause said flexible member to wind thereon and exert pressure on said lever, and automatic means engaging said clutch when rotation of the windmill bearing shaft reaches a predetermined speed.

5. A windmill control apparatus including a motor for turning said windmill into the wind, automatic means for energizing said motor operated by the wind, brake means for controlling the speed of said windmill, a governor rotated by said windmill, and additional means controlled by said governor for setting said brake and disconnecting the automatic motor control means when the speed of said windmill becomes excessive.

ARTHUR FAGERLUND.